Feb. 22, 1966      J. SCHIFFMAN      3,237,195
ALL WEATHER APPROACH SYSTEM
Original Filed Aug. 30, 1961      4 Sheets-Sheet 1
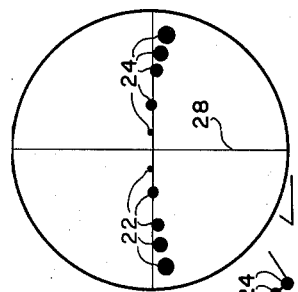
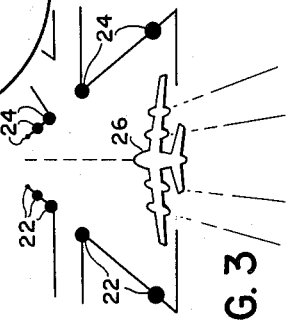
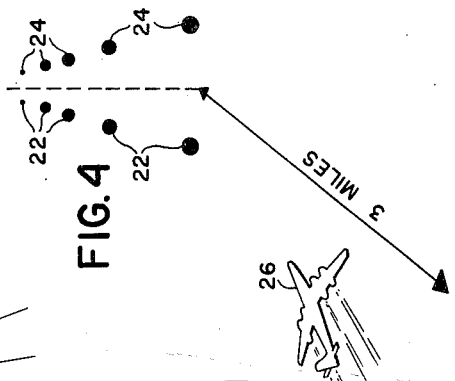
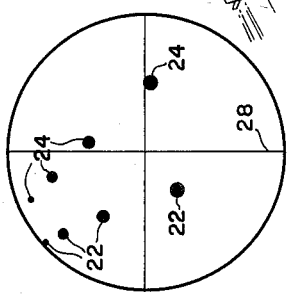
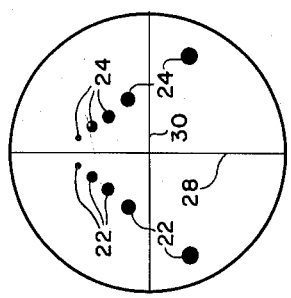
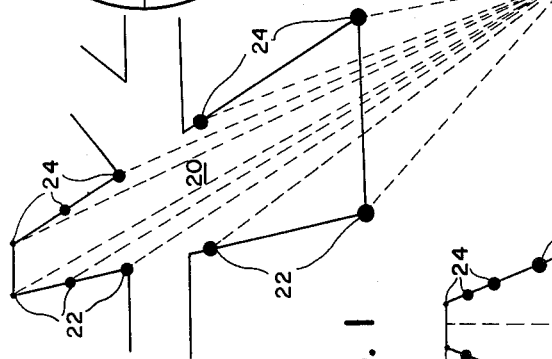
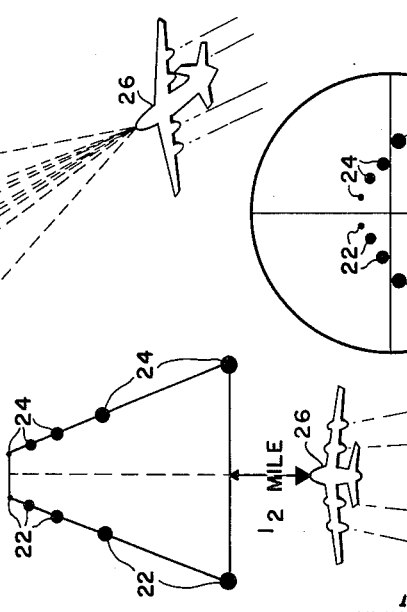
INVENTOR.
JULIUS SCHIFFMAN
BY
*Richard J. Serge*
ATTORNEY Feb. 22, 1966  J. SCHIFFMAN  3,237,195
ALL WEATHER APPROACH SYSTEM
Original Filed Aug. 30, 1961  4 Sheets-Sheet 2

INVENTOR.
JULIUS SCHIFFMAN
BY
Richard J. Seeger
ATTORNEY

Feb. 22, 1966   J. SCHIFFMAN   3,237,195
ALL WEATHER APPROACH SYSTEM
Original Filed Aug. 30, 1961   4 Sheets-Sheet 3
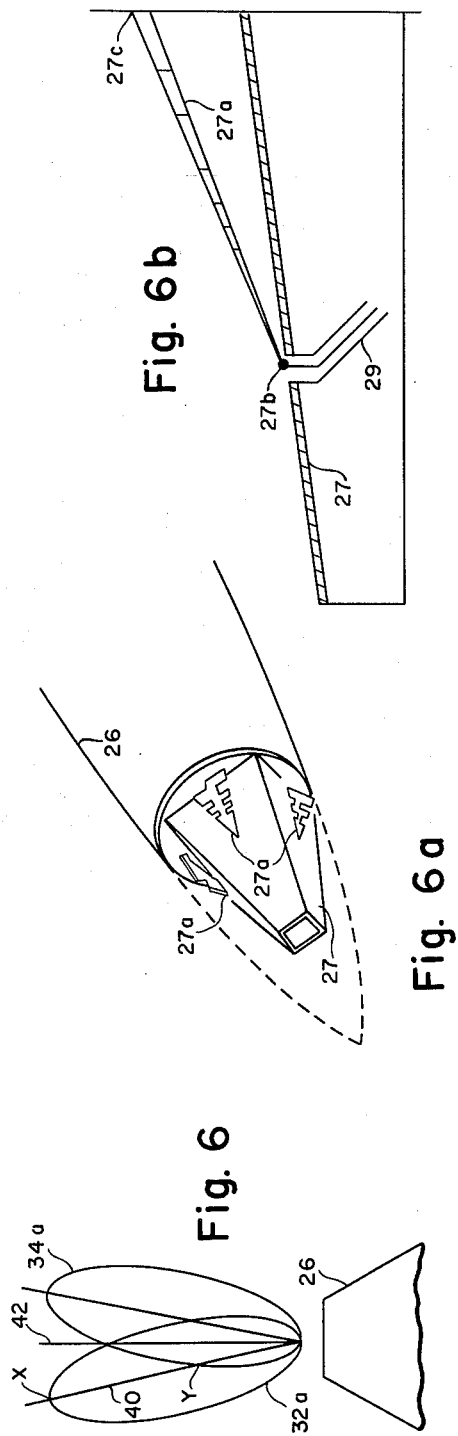
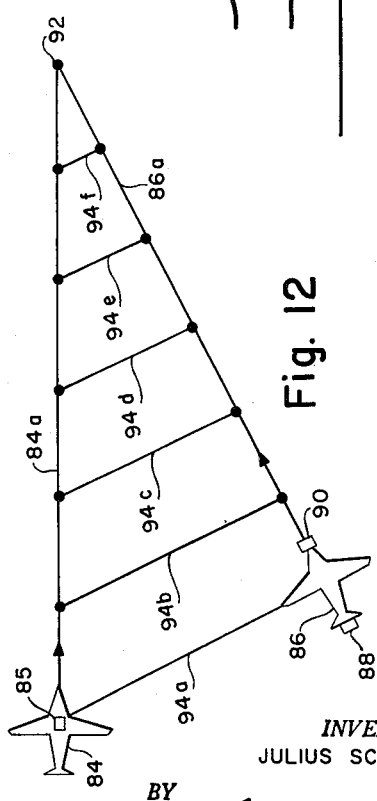
INVENTOR.
JULIUS SCHIFFMAN
BY
*Richard T. Seeger*
ATTORNEY Feb. 22, 1966   J. SCHIFFMAN   3,237,195
ALL WEATHER APPROACH SYSTEM
Original Filed Aug. 30, 1961   4 Sheets-Sheet 4
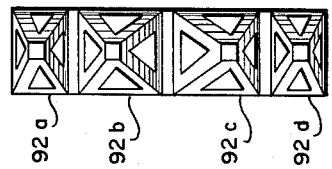
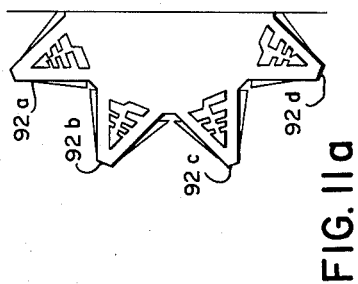
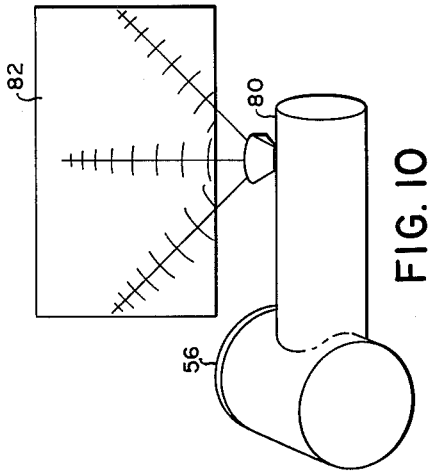
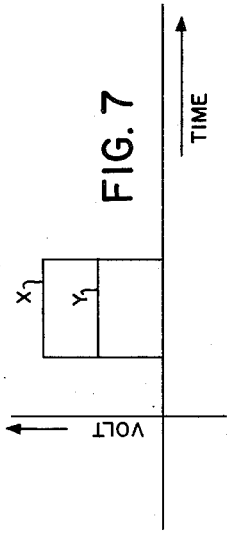
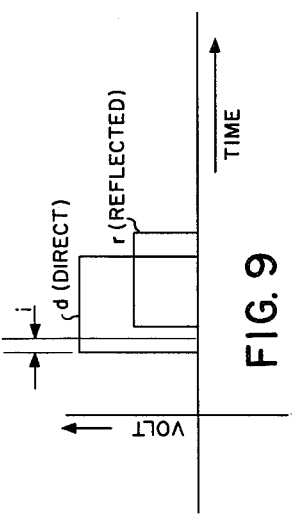
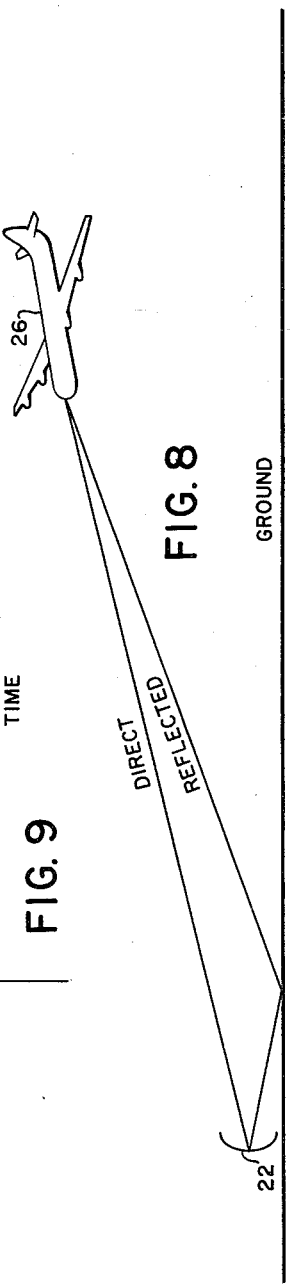
INVENTOR.
JULIUS SCHIFFMAN
BY
*Richard T. Seeger*
ATTORNEY

United States Patent Office 3,237,195
Patented Feb. 22, 1966

3,237,195
ALL WEATHER APPROACH SYSTEM
Julius Schiffman, Huntington Woods, Mich., assignor to The Bendix Corporation, Southfield, Mich., a corporation of Delaware
Continuation of application Ser. No. 137,708, Aug. 30, 1961. This application Oct. 29, 1962, Ser. No. 233,969
23 Claims. (Cl. 343—112)

This is a continuation of my earlier filed application entitled, "All Weather Approach System," Serial No. 137,708 filed August 30, 1961, now abandoned, which is is a contiuation-in-part of my earlier application entitled, "All Weather Approach System," Serial No. 85,166 filed January 26, 1961, now abandoned.

This invention pertains to a method and apparatus for providing visual communication through inclement weather particularly for aircraft. This invention provides an aircraft landing system by presenting to the pilot of the aircraft a picture of ground based reference points, and provides an anti-collision system wherein air vehicle reference points are provided.

A problem existing in the art for many years has been to present to the pilot of an aircraft a continuous picture corresponding to the landing field by offering multiple reference points about the runway which would give the pilot a perspective view thereby enabling a landing. Extensive research and very large amounts of money have been spent in seeking a solution to this problem. Prior to this invention such efforts have not met with success.

Landing systems are known using radio beacons along the runway and a scan type receiver in the airplane wherein a scanning antenna receives and visually presents to the pilot a picture of the ground beacons as indicated in U.S. Patent No. 2,643,374 to Bartow. This system not only requires a prohibitively large scanner to get the required narrow beam, but, a continuous picture is not easily obtainable, if at all obtainable, because no antenna can scan quickly enough without excessively heavy equipment. This continuous picture is vital especially when the air field or landing area is being approached just prior to landing.

Receivers, called monopulse receivers, are known to the art which can receive signals and give a continuous visual indication of the relative location or direction of a signal source. However, these receivers can receive only one signal at a time and therefore if two or more signals arrive at the same time, an ambiguous visual signal would be indicated. This invention makes possible the use of such a receiver to indicate more than one signal source. In the preferred embodiment there are ten signal sources, five on each side of the runway, and by pulsing each of the sources with a pulse width which is very short in comparison to the pulse interval, or time between pulses, the probability of coincident pulses (two or more pulses arriving at the receiver at the same time) is so small that an accurate picture is assured. If the pulse interval is different for different beacons, then the likelihood of ambiguity is further reduced. The pulse interval is selected so that a continuous picture to the human eye is formed on the screen.

It is possible that a pulse width is not small enough in relation to the pulse interval and number of sources to insure that the number of coincident pulses are below the level for non-ambiguous reception. In this event, synchronization of the sources may be employed. Therefore, instead of having independent sources radiating pulses at non-coordinated times, all of the sources, or at least a portion of the sources, are synchronized so that no two pulses are sent at the same time from the synchronized sources thereby insuring non-coincident reception and hence non-ambiguous reception.

This invention uses in combination with the non-coincident ground beacons a monopulse receiver which has a pair of antennas with patterns that overlap in such a manner that a signal direction can be determined by comparing the pattern intercepts. In other words, by instantaneously comparing the amplitudes from each of the antennas, the direction of the signal in the plane of the antennas is determined. By providing a pair of antennas in a second plane, the signal direction can be determined in the second plane. Connecting of the outputs from each pair of antennas to a cathode ray tube then results in a spot on the tube face which corresponds to the direction of the incoming signal; the position of the spot along one axis indicating the direction in the plane of one pair of antennas and the position of the spot along a second axis indicating the direction in the plane of the other pair of antennas. By comparing the amplitude of the antennas, a simplified, functional system is provided. Further, the receiver uses a leading edge gate which takes only the leading edge of the pulse thereby minimizing the effects of reflections.

It is, therefore, an object of this invention to provide an all weather landing system using a monopulse receiver having a visual screen and plurality of ground beacons radiating non-coincident pulses which present a non-ambiguous picture on the receiver screen.

A further object of this invention is to utilize in the combination of the previous object, a monopulse receiver which compares the amplitudes of the antennas in an antenna pair to determine the signal direction in the plane of the antenna pair.

A still further object is to use in the above combination a leading edge gate to reduce the effects of beacon signal reflections to a minimum.

These and other objects will become more apparent when a preferred embodiment is described in connection with the drawings in which:

FIGURE 1 is a diagrammatic picture of an airplane approaching a runway having radiation beacons on either side thereof;

FIGURE 1a is a cathode ray screen representation of the beacons as seen by the airplane receiver in FIGURE 1;

FIGURE 2 is a picture similar to FIGURE 1 with the airplane closer to the runway;

FIGURE 2a is a picture on the cathode ray screen representing the beacons as seen by the airplane's receiver;

FIGURE 3 is a picture of the airplane about to touch down on the runway;

FIGURE 3a is a cathode ray tube picture of the beacons as seen by the airplane receiver for FIGURE 3;

FIGURE 4 shows the airplane approaching the runway from a side angle;

FIGURE 4a is the cathode ray tube representation of the relative airplane position shown in FIGURE 4;

FIGURE 6 is a diagrammatic view of the antenna lobes aligned in the horizontal plane;

FIGURE 6a is a diagrammatic view in perspective of antennas as they might be mounted on an airplane;

FIGURE 6b is a partial sectioned view of an antenna mounted to a pyramid side;

FIGURE 6c is a rectangular coordinate plot of an antenna pattern for a logarithmic periodic antenna;

FIGURE 7 shows the relative outputs from a signal intercepting the lobes as shown in FIGURE 6;

FIGURE 8 shows an airplane receiving a radiation directly from a runway beacon and a reflected radiation;

FIGURE 9 shows the wave form as received in the airplane from the direct radiation and reflected radiation;

FIGURE 10 shows a perspective view of a projector mounted in the airplane cockpit for projecting the beacon pictures on the cockpit windshield;

FIGURE 11a is a diagrammatic plan view of antenna array on an aircraft for anti-collision purposes;

FIGURE 11b is a diagrammatic front view of the antennas in FIGURE 11a;

FIGURE 12 is a diagram of two planes on a collision course.

Figure 5:
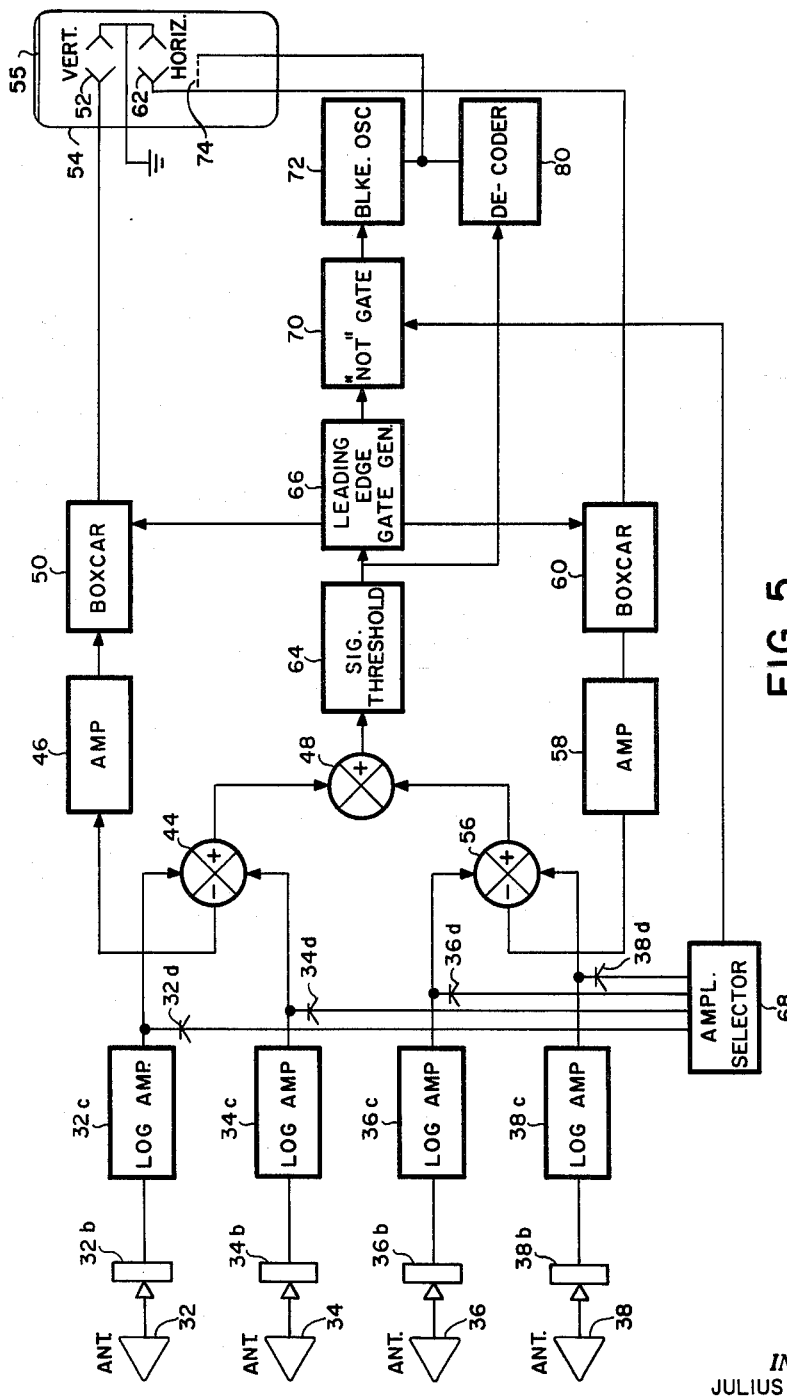
FIGURE 5 is a simplified schematic diagram of the receiver in the airplane.

FIGURES 1–4a of the drawings will be used in an introductory discussion. The manner in which a pilot judges his distances from a runway, his angle to the runway, and his velocity with respect to the runway, is related to the sizes and relative spacing between objects, such as the landing field, trees, buildings, and the rate of change of these object sizes and relationships. If the pilot is provided with some points fixed in relationship to the runway, then he will have sufficient information to land his craft. By radiating a radio signal from each of these fixed points, and providing a receiver in the aircraft for receiving these radiations and presenting a continuous picture of the fixed points, the pilot has fixed reference points which can be "seen" in all kinds of weather.

In FIGURE 1 is seen a runway 20 having spaced along one boundary a plurality of transmitting beacons 22 and on the other boundary a plurality of transmitting beacons 24. There are five beacons shown equally spaced on each side of the runway, although, of course, this number and spacing may be varied. Each beacon radiates a high frequency radio signal which is regularly pulsed with a square wave pulse, with each pulse being of predetermined duration and the pulses being frequent enough so that when they are received, they present a continuous picture to the eye. A satisfactory antenna configuration which may be used to reduce ground reflections is an antenna known as a shaped beam slotted array as described in IRE Transactions, Antennas and Propagation Section, September 1960, p. 477, "Maximally Flat and Quasi-Smooth Sector Beam" by A. Ksienski. Preferably, the pulse width is small, e.g. ½ microsecond in the preferred embodiment, and the pulse rate from one beacon is slightly different from that in another beacon. In the preferred embodiment the pulse rates for the beacons are in the range of 300–500 pulses per second. The chance of pulses from two or more beacons arriving at the same time is small, so that the number of coincident pulses, those pulses arriving at the receiver simultaneously, is below the level which would cause ambiguity between the relative placement of the beacons on the receiver screen. As pulse rate increases, relative to the pulse width, a need for synchronizing the pulses arises. Synchronization would prevent two pulses from being transmitted at the same time thereby preventing any ambiguity.

The radiations from beacons 22 and 24 are received by airplane 26 and a receiver, which will later be described, is positioned in the aircraft to give a continuous visible display of each beacon. As an alternative, beacons 22 and 24 contain synchronizing means, which are well known to the art, so that no two pulses are emitted at the same time.

The airplane 26 in FIGURE 1 is in line with the runway and approximately 3 miles from the end of the runway and under these conditions, the beacons would appear on the receiver screen as shown in FIGURE 1a. The pilot can determine his distance from the end of the runway by the angle formed by the center line 28 and the lines on which beacons 22 and 24 are placed; and the elevation of aircraft 26 is determined by the number of beacons which are above, or below horizontal center line 30. The position of each beacon on the display of FIGURE 1a represents only the angle that the beacon makes with the receiving antennas. Therefore, the ordinate of each dot represents the ordinate of the beacon angle and the abscissa of each dot, represents the abscissa of the beacon angle. For a given beacon angle, the dot will be in the same place regardless of the distance of the beacon from the aircraft.

If the airplane approaches the runway, as shown in FIGURE 2, where the airplane is about ½ mile from the end of the runway, the screen on the pilot's instrument panel would appear as FIGURE 2a, with the angle formed by the lines of beacons 22 and 24 being increased with reference to vertical line 28. The lines of beacons 22 and 24 form larger and larger angles with center line 28 until the airplane touchdown, FIGURES 3 and 3a.

If, for example, the plane approaches the runway at a side angle, as shown in FIGURE 4, the beacons would appear on the pilot's screen as shown in FIGURE 4a, indicating that he is approaching the runway at a particular angle and at the same time indicating his distance from the end of the runway by noticing the angle formed by the lines on which beacons 22 and 24 are placed.

*Antenna and receiver*

The antenna system and receiver used, which are placed in the airplane for receiving and presenting the continuous picture of the beacons to the pilot, will now be described with the aid of the schematic shown in FIGURE 5 and with the diagrams of FIGURES 6–9. Located in a horizontal alignment on the airplane are two complementary antennas 32, 34 which are, in this embodiment, divergent so that their lobes appear as in FIGURE 6, which are non-coextensive but overlapping. The purpose of the two antennas 32 and 34, which are in horizontal alignment, is to receive the beacon signals and then send these signals to means, which will be later described, for locating the beacon position horizontally. Also located on the airplane in vertical alignment and slightly divergent are complementary antennas 36, 38 which are connected to means, also later described, for determining the beacon positions vertically.

Assume for the moment that lobe 32a (FIGURE 6) is the lobe for antenna 32 and lobe 34a is the lobe for antenna 34. As mentioned, these lobes are directed outwardly at a divergent angle so that if a signal from a beacon should be received at an angle such as signal 40, it will intercept lobe 32a at point X and intercept lobe 34a at point Y, giving corresponding levels of voltages as shown in FIGURE 7. By knowing the antenna lobe for each antenna, the amplitude of these voltages can be compared to determine just what angle the received signal 40 makes with the center line 42 to determine the horizontal angle of the signal. In similar manner, antennas 36 and 38 have characteristic lobes, and a signal which is received can be vertically placed by comparing the voltages which are picked up almost simultaneously by the antennas.

A particular antenna structure that gives satisfactory results is shown mounted to an aircraft nose in FIGURE 6a. Aircraft 26 has mounted in a forward position a truncated pyramid 27 having four logarithmic periodic antennas 27a, which would correspond to antennas 32–38, mounted on its sides. There are two sets of complementary antennas, with antennas on opposite sides of the pyramid 27 forming a set. Each antenna 27a is connected to the center conductor of a coaxial line 29 which extends through a pyramid side, FIGURE 6b, and is angled away from the pyramid side so that each antenna base 27c is spaced from the pyramid side. In this manner, the pyramid sides act as ground planes and antenna patterns such as those shown in FIGURE 6c are possible.

In FIGURE 6c, two patterns for complementary antennas 27a are shown with Received Signal Strength in decibels plotted along the ordinate and Signal Direction plotted along the abscissa. The curves intersect along the zero angle direction indicating that the signal strengths are equal at that point. At a signal direction α the curves are intersected at points $\alpha_1$ and $\alpha_2$ respectively and each direction would have a distinctive set of curve intercepts which can be processed to indicate the signal direction as explained below. The logarithmic periodic antenna is an antenna known to the art and described in 1957 IRE Convention Record, part I, p. 119 to 128 "Broadband Logarithmically Periodic Antenna Structure" by R. H. Du Hamel and D. E. Isbell. From FIGURE 6c it can be seen that the amplitude output from the antenna, which is plotted in decibels, varies in an exponential manner with the Received Signal Direction.

Each antenna, 32, 34, 36 and 38, is connected to a corresponding crystal rectifier, 32b to 38b, which removes the high frequency carrier radiated by beacons 22, 24, so that only the pulses are transmitted to logarithmic amplifiers 32c–38c respectively. Logarithmic amplifiers are known to the art and produce a signal which is proportional logarithmically to the input signal to the amplifier. The crystal detectors also help to modify the signal so that when the logarithm is taken by the logarithmic amplifiers, a signal will be obtained which is linear to the received signal direction. This will be illustrated later in equation form.

The logarithmic amplifiers receive the signals from the detectors and convert them to a voltage which corresponds to a logarithm value which when differenced with a logarithm value of the other antenna with which it is aligned, will determine accurately the position of a beacon signal along the axis of antenna alignment. Taking the difference of two logarithms results in a division or ratio. This is important because, as previously explained, it makes the system amplitude independent and accurate representation of the beacon signal on the receiver screen is performed at all distances of the aircraft from the beacons.

The two antennas of each pair of complementary antennas provide a pair of signals the magnitude of which varies depending on where the received pulse of energy intercepts the patterns. Each signal to a detector varies in an exponential manner according to the direction of the received signal. The detectors and logarithmic amplifiers prepare this signal and the result is a logarithmic signal which varies in a linear manner to the received signal.

This may be seen more clearly by equation representation.

Let:

$E_1$ = Voltage from one antenna in a pair of complementary antennas, such as antenna pair 32, 34 or pair 36, 38;
$E_2$ = Voltage from the other antenna in the pair; and
$k$ = constants; and
$\theta$ = angle of arrival of the received radiation.

The antennas have characteristics such that:

(1) $$\frac{E_1}{E_2} = \epsilon^{K\theta}$$

The log amplifiers and the crystal detectors take the logarithms of the above equation, so that (2) $$\log_\epsilon \frac{E_1}{E_2} = \log_\epsilon \epsilon^{K\theta}$$

which is equivalent to:

(3) $$\log_\epsilon E_1 - \log_\epsilon E_2 = k\theta$$

so that by subtracting two quantities, $\log_\epsilon E_1$ and $\log_\epsilon E_2$, a signal is produced which varies linearly with received signal direction, $\theta$, and is independent of signal level since a ratio $$\log_\epsilon \frac{E_1}{E_2}$$

is being taken. It is not necessary to take the anti log of the output from the log amplifiers. Although the relationships between the antenna, crystal detectors, and amplifiers would not necessarily be exactly as represented by these equations, the principles are well illustrated by the use of the equations. The components are "fitted" to each other to obtain the end result of logarithmic signals which vary in a linear manner to signal direction.

After the antenna signals are compared, they pass through a boxcar storage circuit and are applied to the deflection plates of a cathode ray tube forming a picture on the tube screen. The signals from horizontally aligned antennas 32 and 34 are fed from log amplifiers 32c and 34c, to a sum and difference device 44, which takes the log difference of the two signals, which is the log quotient, and feeds this to an amplifier 46 and takes the sum of these two signals and feeds this to a second summing device 48. Amplifier 46 is connected through a boxcar circuit 50 to one pair to deflection plates 52 of a cathode ray tube 54. The boxcar circuit 50, which is gated by a leading edge gate 66 to receive only the leading edge of a pulse, lengthens the leading edge of each pulse which is received by it from amplifier 46 so that a better display is presented on the screen 55 of cathode ray tube 54.

The signals from vertically aligned antennas 36 and 38 are fed from log amplifiers 36c and 38c to a sum and difference device 56, which takes the difference of the two voltages, or log quotient, and feeds this to an amplifier 58 and the sum to summing device 48. The signal from amplifier 58 is fed through a boxcar circuit 60 which performs the same function as circuit 50, to a second set of deflection plates 62 of cathode ray tube 54.

The output of the summing device 48 is connected to a signal presence or threshold device 64, which in turn is connected to a leading edge gate 66. The threshold device 64 will not pass signals to gate 66 which are below a predetermined minimum so that the very weak signals, such as crystal noise signals, and signals which fall out of logarithmic range of the log amplifiers 32c–38c will not be passed since gate 66 will not trigger boxcars 50, 60.

Connected between amplifiers 32c and 38c and an amplitude selector device 68 are diodes 32d to 38d, respectively. Device 68, which can be adjusted to vary the bias on diodes 32d–38d, is connected to a "not" gate 70 which is connected between the leading edge gate generator 66 and a blocking oscillator 72 which controls the voltage to a grid 74 of tube 54. Diodes 32d–38d are normally nonconductive but if any antenna receives a signal exceeding a predetermined maximum, then its corresponding diode will conduct, sending a signal to the "not" gate 70 through amplitude selector 68, to block out signals to screen 55. Therefore, if a signal comes in which is so strong that it will be outside the log range of amplifiers 32c to 38c and therefore would result in an inaccurate signal to the pilot, the signal will be squelched.

If the signal received by signal presence device 64 from summing device 48 exceeds a predetermined minimum, indicating that it is an adequate beacon signal and not a crystal noise signal, and if the sum of all of the signals through diodes 32d–38d is less than a predetermined maximum, indicating that signals are within the log range of amplifiers 32c–38c, the leading edge gate generator 66 is actuated, operating boxcar circuits 50 and 60 so that they receive the leading edge of the pulse from amplifiers 46 and 58, respectively, to provide a signal to deflection plates 52 and 62.

The manner in which leading edge gate generator 66 minimizes reflected beacon signals from appearing on the cathode ray tube 54 screen will now be discussed in connection with FIGURES 8 and 9. The signals from beacons 22 and 24 will tend to be reflected off the ground or other objects, as shown in FIGURE 8, and therefore, be received by airplane 26 at a different angle than the direct path signal which would give an erroneous signal or signals to the pilot. In order to minimize this, only the leading edge of the pulses radiated by beacons 22 and 24, are used to establish the display of the beacons on the cathode ray tube screen. A reflected path signal such as wave form "r," would arrive at the airplane 26 later than the direct path radiation, wave form "d," since the reflected path is longer. Generator 66 will energize the boxcars 50 and 60 for only a very short interval, as indicated by the letter "i" in FIGURE 9, and the reflected path signal will now be considered in determining the voltages of the cathode ray tube deflection plates 52, 62. Therefore, the reflected path signals will be minimized.

Preferably, the range of transmitted wavelengths from beacons 22–24 is .4 mm. to 10 cm.

Operation

Briefly, the operation of the receiver in this system is as follows:

Ground beacons 22 and 24 are pulsed with a high frequency signal. The pulse width is small compared to the pulse interval and the pulse intervals for different beacons are slightly different. This lessens the statistical probability of coincident pulses.

A signal is received by antennas 32 to 38 which have outputs varying in an exponential manner with the received signal direction. The signals are then detected by rectifiers 32b–38b after which log amplifiers 32c and 38c take the logarithm of this signal to provide a logarithmic quantity that varies linearly with received signal direction.

Antennas 32 and 34 are horizontally aligned, and signals from these two antennas are sent by log amplifiers 32c and 34c, respectively, to a sum and difference device 44, which delivers the difference of the signals or log quotient of the two signals to amplifier 46 and the log sum to summing device 48. In like manner, the sum and difference of the signals from vertically aligned antennas 36 and 38 are delivered by sum and difference device 56 to summing device 48 and amplifier 58, respectively. The characteristics of amplifiers 32c and 38c must be closely designed or mated to the characteristics of the lobes of antennas 32–38, and the crystal characteristics since the horizontal and vertical position of a beacon is determined by the points at which a signal intercepts the lobes, and the accuracy of the system is determined by the combined characteristics of the antennas, crystals, and log amplifiers.

Amplifiers 46 and 58 send signals through boxcar circuits 50 and 60 to deflection plates 52 and 62, respectively, of cathode ray tube 54 to display the angular coordinates of the beacons on the screen 55 of tube 54. In order not to reproduce noise signals, which are of lower amplitude than the beacon signals, devices 44 and 56 also send signals to a summing device 48 which sends the sum of the two signals to a signal presence or threshold device 64 which allows a signal to pass to leading edge gate generator 66 only if their sum is above a predetermined minimum. Also, to prevent very strong signals, which would be outside the log range of amplifiers 32c to 38c, from being passed, diodes 32d to 38d are placed between amplifiers 32d to 38d and device 68. If a signal greater than a predetermined maximum is received by an antenna, this signal will pass the corresponding diode to device 68 which will then operate to squelch the signals.

Threshold device 64 sends its signal to a leading edge gate generator 66. Leading edge gate 66 operates boxcar circuits 50 and 60 for a very short period so that just the amplitudes corresponding to the leading edges of the pulses received from beacons 22 and 24 are allowed to pass to deflection plates 52, 62 of tube 54. This prevents ground reflections from beacons 22, 24, which arrive at antennas 32, 38 later than the direct radiations from the beacons, from influencing the picture presented to the pilot. Also gate generator 66 provides a signal to control grid 74 through "not" gate 70 and blocking oscillator 72. If any of the biased diodes 32d to 38d conduct, gate 70 will act to block the signal to grid 74.

In FIGURE 10, a projector 80 is shown mounted in the airplane cockpit adjacent the cathode ray tube screen 55 for projecting the image on the cockpit windshield 82. This places the runway beacons on the windshield in the same position as the runway lights would appear to the pilot.

Anti-collision device

This system is also capable of operating as an anti-collision device. By providing an increased antenna array, as shown in FIGURES 11a and 11b and by adding a decoder 80 between threshold device 48 and grid 74, signals from coded radiating beacons from other aircraft may be received to indicate the relative aircraft position on screen 55.

In FIGURE 12 are shown two aircraft 84, 86 flying along paths 84a and 86a respectively. Aircraft 84 has a transmitter 85 and an essentially omnidirectional transmitting antenna which may transmit coded signals conveying such information as aircraft bearing, elevation and velocity. Aircraft 86 has at the front and rear of the aircraft receiving antenna arrays 88, 90, each of which may have four truncated pyramids 92a–92d as shown in FIGURES 11a and 11b. Each pyramid has four logarithmic antennas connected thereto as previously described for pyramid 27. The receiver in aircraft 86 is that shown in FIGURE 5 with decoder 80 connecting threshold device 64 and grid 74. The operation will be similar to that described previously for the FIGURE 5 circuit with the addition of decoder 80 which decodes any signal received from threshold device 64. Various commercially available computers may be used for both coder in aircraft 84 and decoder 80 in aircraft 86, which are well known to the art, to establish this information. For less precise information of aircraft which are collision threats, the coder and decoders are unnecessary.

To determine, with or without decoder 80, any aircraft on a collision course with the aircraft 86, the pilot need only observe his display and look for radiations that are approximately stationary on his screen. This means that an aircraft, such as aircraft 84, is maintaining the same relative angle to aircraft 86 indicating that the aircraft 84 and 86 are on a collision course.

This may be seen by looking at FIGURE 12. If aircraft 84 and 86 are approaching point 92 along approximately steady paths and are going at respective velocities which would bring them to point 92 at approximately the same time, then the lines, 94a to 94f, which are the lines connecting the aircraft at successively later times, will be parallel and aircraft 84 represented on the display screen in aircraft 86 will be approximately stationary on the screen since it has the same relative angle. As previously discussed, the representation on the screen indicates the angle of the received radiation only and not the range of the received radiation.

Aircraft 84 and 86 may each have both transmitting and receiving antennas and the transmitter on one aircraft may be isolated from the receiver on the other aircraft by either a time sharing between the transmitter and receiver or operation on different frequencies with corresponding rejection filters, as is well known in the art.

With properly designed antennas, having optimum directional characteristics to eliminate reflections, continuous wave transmission may be used for the transmitter in the anti-collision system.

The aircraft receiving antenna and the transmitting antenna are designed and located to minimize polarization which might preclude reception in a particular aircraft attitude or position, by means well known in the art.

Another advantage of using log amplifiers 32c to 38c is that a greater range of signal intercepts of the antenna lobe, and hence coverage, is possible. Further, a local oscillator may be used in the diagram of FIGURE 5 to heterodyne the signal coming from the log amplifiers so that an intermediate frequency may be used for better results, as is well known in the art. While the system shown uses amplitude comparison of the signals from the log amplifiers 32c to 38c it is of course also possible to have a system using phase comparison so that the phases are compared to determine the voltage applied to the deflector plates of the cathode ray tube.

Although this invention has been disclosed and illustrated with reference to particular applications, the principles involved are susceptible of numerous other applications which will be apparent to persons skilled in the art. The invention is, therefore, to be limited only as indicated by the scope of the appended claims.

Having thus described my invention, I claim:

1. An all weather approach system to enable safe approach between two objects, with a transmitting means being on one object and a receiving means being on the other object, comprising
   means for transmitting pulses each of a frequency capable of penetrating inclement weather conditions,
   means for transmitting said pulses from a plurality of positions sufficiently spaced to provide distance perception,
   monopulse receiving means for receiving one pulse at a time and visually displaying said pulses,
   said last means establishing a value for each pulse in each of two coordinate planes to define the pulse direction,
   said receiving means including a pair of receiving antennas in each of said coordinate planes with the antennas in each pair having overlapping antenna patterns so that an incoming signal will intersect said patterns at points along and corresponding to the pulse direction,
   comparison means for instantaneously comparing the signals from the antennas in each pair to determine the pulse direction in each coordinate plane,
   said pulse transmitting means transmitting pulses from each of said positions so that the number of coincident pulses received by said receiving means is less than that number which would cause ambiguous display.

2. The system of claim 1 wherein said pulse transmitting means includes means for establishing pulse widths sufficiently small relative the pulse intervals to avoid said ambiguity, said pulse intervals being sufficiently small so that a continuous visual signal is presented for said positions.

3. The system of claim 1 wherein said pulse transmitting means includes means for synchronizing the transmission of said pulses.

4. The system of claim 1 wherein said antennas are logarithmic periodic antennas.

5. The system of claim 1 with said receiving means having a leading edge gate generator for utilizing only the leading edge of the pulse to form said visual display.

6. The system of claim 5 having a boxcar circuit connected to the leading edge gate generator for increasing in duration the leading edge to a predetermined time length.

7. The system of claim 1 with the intervals between pulses from said different positions being sufficiently dissimilar so that simultaneous reception of a series of pulses from a plurality of said signals is minimized.

8. The system of claim 2 wherein said pulse transmitting means transmits pulse sequences having at least two different pulse intervals.

9. The system of claim 1, wherein said receiving means comprises detector means connected to each of said antennas,
   nonlinear amplifying means for amplifying the received pulse signals,
   a differencing means being connected to the outputs of said nonlinear amplifying means,
   each of said antennas providing a signal to its corresponding detector means which signal varies in a nonlinear ratio to the received signal direction,
   each of said amplifying means amplifying said signal in a nonlinear manner to provide a signal which results in a ratio when differenced with a signal from another amplifying means in the same coordinate plane and which ratio is in linear relationship to the received signal direction in said same coordinate plane.

10. The system of claim 1 having detector means connected to each antenna,
    logarithmic amplifying means being connected to each detector means,
    said detector means being connected between its corresponding antenna and logarithmic amplifying means,
    said antennas providing a signal to their corresponding detector means varying substantially exponentially as the received signal direction,
    said detector and logarithmic amplifier taking substantially the logarithm of said exponential signal,
    differencing means for subtracting the outputs of two logarithmic amplifier means thereby providing a logarithm signal varying in a substantially linear relation with said received signal direction.

11. The system of claim 1 having detector means being connected to each antenna,
    logarithmic amplifying means being connected to each detector means,
    said detector means being connected between its corresponding antenna and logarithmic amplifying means,
    the ratio of signals from the antennas in each pair vary substantially exponentially as the received pulse direction in the coordinate plane of the antennas,
    said logarithmic amplifying means taking the logarithm of each of said signals,
    differencing means for subtracting the output of the logarithmic amplifying means for the two antennas in each pair providing a signal for each antenna pair varying in a substantially linear relation with said received signal direction in the coordinate plane of the respective antenna pair, thereby providing a difference signal for each pair of antennas,
    display means,
    said two difference signals being connected to said display means to cause a visual representation of said signals on said display means.

12. An all weather approach system between a vehicle and an object comprising
    means for transmitting pulses from a plurality of positions with said pulses being of a frequency capable of penetrating inclement weather conditions with a minimum of distortion,
    said transmitting means transmitting said pulses in a substantially non-coincident sequence,
    said transmitting means transmitting pulses from predetermined positions on the object,
    receiver means having a first pair of receiving antennas aligned along a first axis,
    and a second pair of receiving antennas aligned along a second axis orthogonal to said first axis,
    each antenna having a characteristic lobe pattern which overlaps but is non-coextensive with the lobe pattern of the other antenna in its pair,
    said lobe patterns intercepting said transmitted pulses,
    said receiver means having means for comparing the amplitude of the antenna lobe pulse intercepts in each pair of antennas to provide a signal that corresponds to the direction of the transmitted pulse relative said first antenna pair and to provide a signal that corresponds to the direction of the transmitted pulse relative said second antenna pair, and providing a signal for each antenna pair,
    display means for translating the comparison signals to a visible display to locate each of said transmitting means predetermined positions.

13. The system of claim 12 where said means for comparing the amplitudes of the lobe intercepts comprises
    detecting means connected to each of said antennas,
    logarithmic amplifiers means connected to said detecting means,
    said detecting means and logarithmic amplifier means converting the signal received by each antenna to a proportional logarithm value,
    means for differencing the logarithm signals from the logarithmic amplifiers for antennas along said first axis to obtain a first difference,
    means for differencing the logarithm signals from the logarithmic amplifiers for antennas along said second axis for obtaining a second difference,
    said display means comprising a cathode ray tube having two deflection channels,
    one of said deflection channels being connected to said first difference means and the other of said deflection channels being connected to said second difference means.

14. The system of claim 13 with a leading edge gate generator being between said difference means and said deflection channels,
    a boxcar circuit being connected between said leading edge gate generator and said deflection channels,
    said leading edge gate generator permitting only the leading edge portion of each pulse to said boxcar circuit which elongates the leading edge of the pulse and sends the elongated leading edge to said deflection channels.

15. The system of claim 14 with a summing circuit being connected between the outputs of said difference means and said leading edge gate generator for adding the differences from said first and second logarithmic amplifier means,
    a signal threshold device being connected between the output of said summing device and the input of said leading edge gate generator for actuating to said leading edge gate generator only when the amplitude of said signal is more than a predetermined minimum, thereby minimizing spurious signal representation on said display means,
    squelch circuit means connecting each of said logarithmic amplifiers to said cathode ray tube to cut off said cathode ray tube whenever the signal in any of said logarithmic amplifiers exceeds a predetermined maximum, to minimize distorted signal representation on said display means,
    said squelch circuit comprising,
    a diode being connected to each of said logarithmic amplifiers,
    an amplitude selector connected to each diode for applying a variable bias to said diodes,
    a "not" gate,
    a blocking oscillator,
    said "not" gate being connected between said leading edge gate generator and said blocking oscillator,
    said blocking oscillator being connected to said cathode ray tube,
    said diodes being in a normally non-conductive state but driven to conduction when any antenna receives a signal exceeding the logarithmic range of said logarithmic amplifirs to actuate said "not" gate to trigger said blocking oscillator thereby cutting off said cathode ray tube.

16. An all weather approach system to enable safe approach between two objects with means for transmitting pulses being on one object and monopulse receiving means being on the other object comprising
    means for transmitting pulses each of a frequency capable of penetrating inclement weather conditions,
    means for transmitting said pulses from a plurality of positions on one object spaced at a distance from each other to enable visual perception of the relative change between said positions as said objects approach one another,
    monopulse receiving means for establishing the direction of each pulse in each of at least two planes,
    said receiving means on the other object combining said directions of said planes to establish a visible representation for each of said transmitting positions,
    said pulse transmitting means transmitting pulses from each of said positions so that the number of coincident pulses received by said receiving means is less than that number which would cause ambiguous display.

17. The approach system of claim 16 wherein said pulse transmitting means are on each side of a landing runway,
    the visible representations of said pulse transmitting means on opposite sides of the runway becoming symmetrically aligned and the spacing between said representations increasing as said runway is approached at the proper angle of descent and direction.

18. A method of providing an all weather approach system between two objects comprising the steps of
    transmitting pulses of a frequency capable of penetrating inclement weather from one object,
    transmitting said pulses from a plurality of positions on said one object with said positions being spaced at a distance from each other to enable visual perception of the relative change between said positions as said positions are approached,
    receiving each of said pulses on the other object simultaneously with at least two antennas in each of at least two planes and establishing the direction that each pulse is traveling in each of the two or more planes,
    combining said directions of said planes and establishing a visible representation for each of said positions from which said pulses are transmitted,
    transmitting said pulses so that the number of coincident pulses being received is less than that number which would result in ambiguous visual reception.

19. The method of claim 18 wherein said last step includes synchronizing said pulses to avoid ambiguous representation.

20. The method of claim 18 wherein said last step includes transmitting said pulses at intervals sufficiently larger than said pulse widths to avoid ambiguous visual representation but transmitting at an interval sufficiently small for a continuous visual representation.

21. In the method of claim 20 the step of
    transmitting said pulses so that there are at least two different pulse intervals.

22. An all weather approach system to enable safe approach between two objects, with a transmitting means being on one object and a receiving means being on the other object, comprising
    means for transmitting pulses of a frequency capable of penetrating inclement weather conditions,
    a monopulse receiving means for receiving one pulse at a time and visually displaying said pulses,
    said last means establishing a value for each pulse in each of a first and second coordinate plane to define the position of the source of said pulse,
    said receiving means including a pair of receiving antennas in each of said first and second planes and the antennas in each pair having overlapping antenna patterns so that an incoming signal will intersect said patterns along the line of signal direction,
    said receiving means including means for making the reception of said transmitting pulses independent of range so that the position of the pulse source is represented on the visual display for all ranges between the transmitting means and the receiving means, comparison means for each of said antenna pairs for instantaneously comparing the signal from one antenna in a given pair to the signal received by the other antenna in said given pair to determine the pulse direction in the coordinate plane of said given pair, said means for making the reception of said transmitting pulses independent of range comprising, a pair of antennas in each of said coordinate planes for receiving the pulses, said antennas having characteristics so that the ratio of pulses of the antennas in each plane varies substantially exponentially as the direction of the received pulse in the plane of the antennas and the pulse source, logarithmic amplifying means for taking the logarithm of each of the outputs of said antennas, a differencing means for subtracting the outputs of the logarithmic amplifying means for the antenna in one of said planes and a differencing means for subtracting the outputs of the logarithmic amplifying means for the antennas in the other of said planes, to provide two signals which vary in a substantially linear relation with the direction of the received pulses for all distances between the transmitting means and receiving means, said receiving means having, a leading edge gate generator for utilizing only the leading edge of the received pulses to form said visual display, a boxcar circuit connected to the leading edge gate generator for increasing in duration the leading edge to a predetermined time length.

23. The system of claim 1 with display means, said compared signals from said comparison means being connected to said display means to provide a two dimensional visual display of each of the plurality of positions from which the pulses are transmitted.

References Cited by the Examiner

UNITED STATES PATENTS

| | | | |
|---|---|---|---|
| 2,003,933 | 6/1935 | Greig | 343—121 |
| 2,226,860 | 12/1940 | Greig | 343—101 |
| 2,422,122 | 6/1947 | Norton | 343—114.5 |
| 2,643,374 | 6/1953 | Bartow | 343—108 |
| 2,931,032 | 3/1960 | Newhouse | 343—114.5 |
| 3,013,265 | 12/1961 | Wheeler | 343—113 |
| 3,050,729 | 8/1962 | Fromm | 343—114.5 |

OTHER REFERENCES

"The Cathode Ray Oscillograph in Radio Research," by R. A. Watson-Watt, 1935, His Majesty's Stationary Office, London, pages 235–242 relied on.

LEWIS H. MYERS, *Primary Examiner.*

CHESTER L. JUSTUS, *Examiner.*